Oct. 2, 1962 A. A. DE FORD 3,056,604
BOWLING APPARATUS
Filed Nov. 13, 1958 9 Sheets-Sheet 1

INVENTOR.
Ambrose A. DeFord
BY
Attorney

Oct. 2, 1962 A. A. DE FORD 3,056,604
BOWLING APPARATUS
Filed Nov. 13, 1958 9 Sheets-Sheet 2

Inventor:
Ambrose A. DeFord
By: [signature]
Attorney

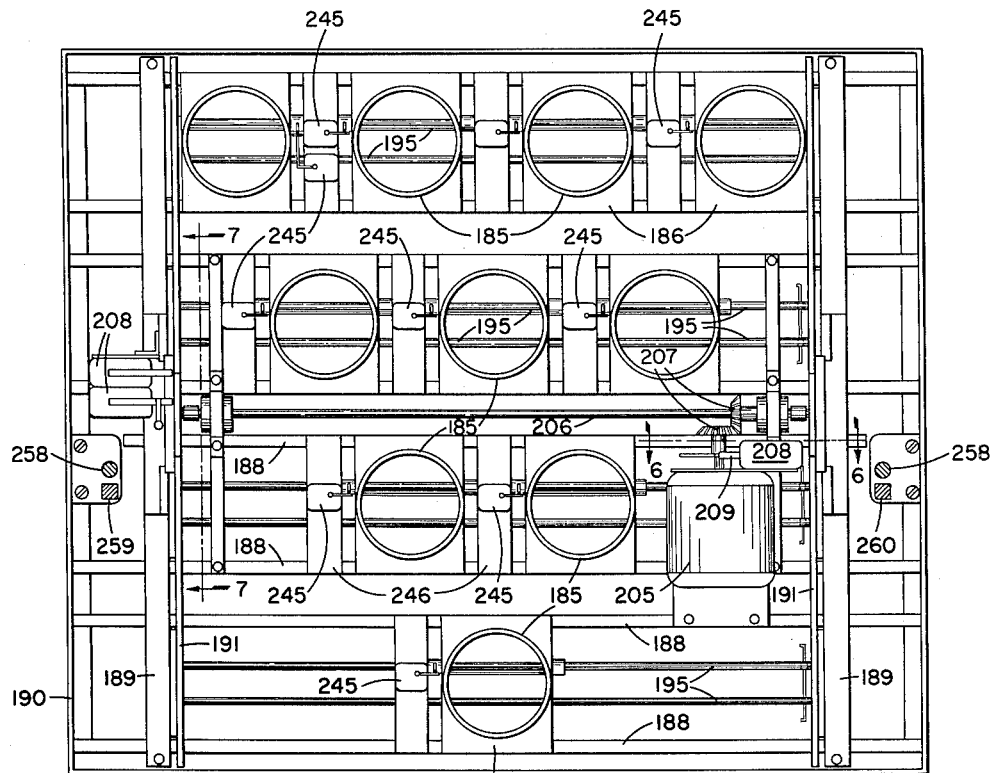
Fig. 4
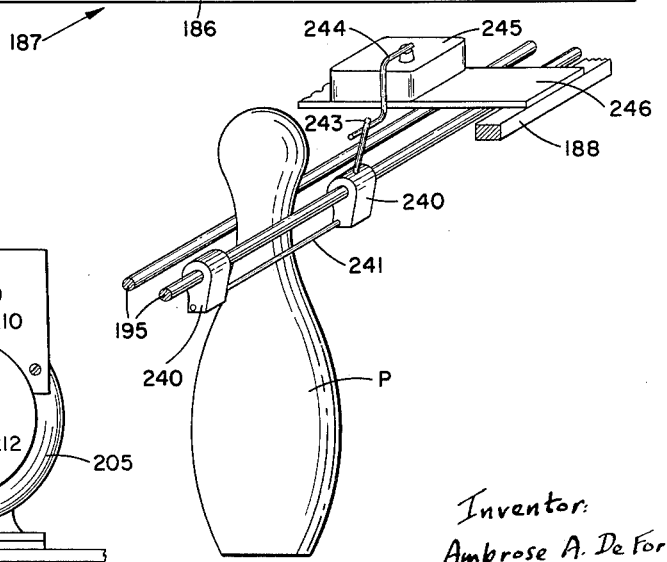
Fig. 6
Fig. 5
Inventor:
Ambrose A. De Ford
By: B. F. Schlesinger
Attorney Oct. 2, 1962

A. A. DE FORD 3,056,604

BOWLING APPARATUS

Filed Nov. 13, 1958

Inventor:
Ambrose A. De Ford
By [signature]
Attorney

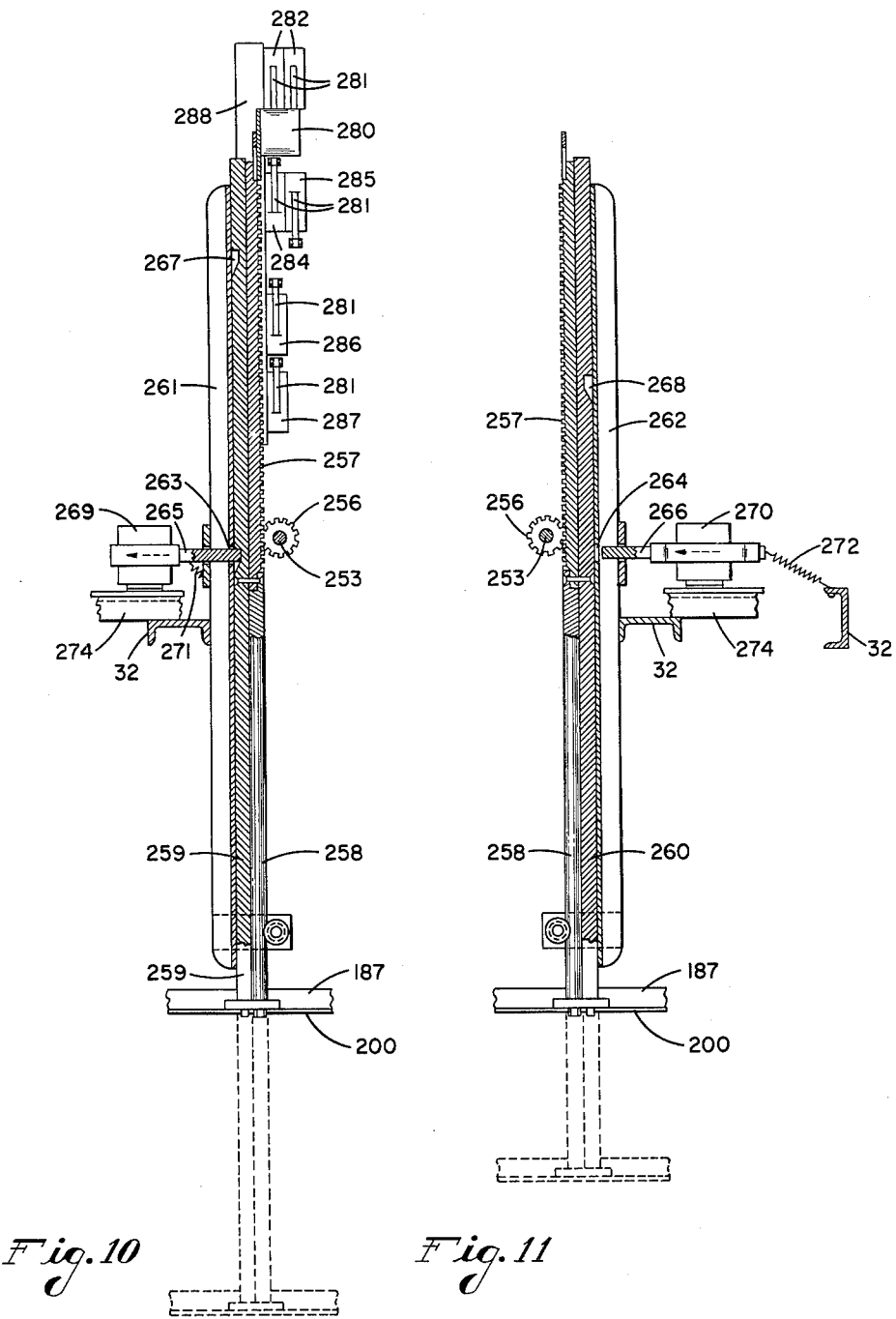

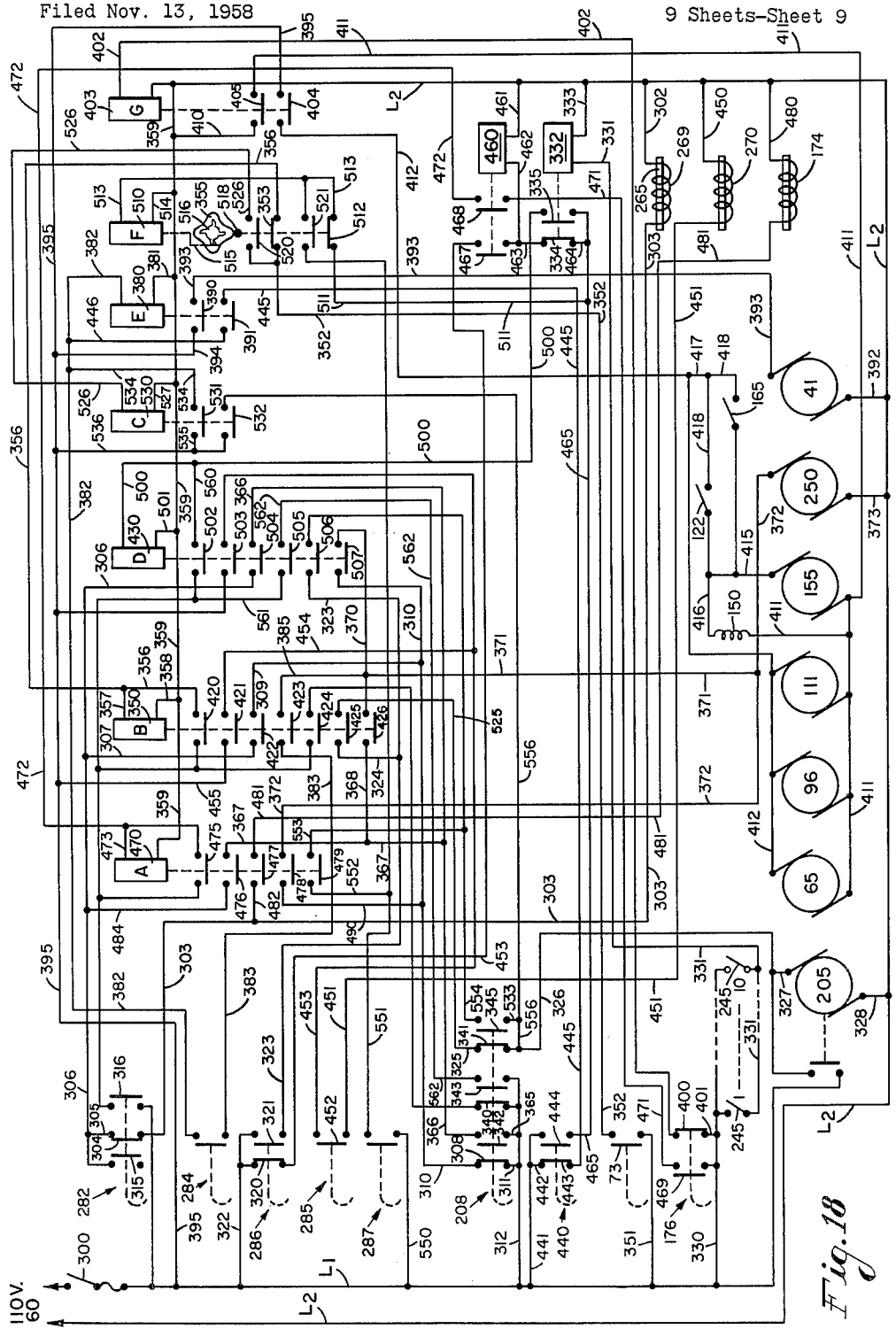

United States Patent Office 3,056,604
Patented Oct. 2, 1962

3,056,604
BOWLING APPARATUS
Ambrose A. De Ford, Rochester, N.Y., assignor to Gee-Bee, Inc., Rochester, N.Y., a corporation of New York
Filed Nov. 13, 1958, Ser. No. 773,794
6 Claims. (Cl. 273—43)

The present invention relates to apparatus for setting pins on a bowling alley, and more particularly to apparatus for setting pins on a miniature bowling alley.

The game of bowling has become so popular that in most taverns there is to be found apparatus simulating on a very small scale a bowling alley and permitting a person to bowl a game generally similar to a regulation bowling game. In the usual form of such apparatus, the pins are pivoted to swing up out of the way when a miniature ball or chucker passes by a photoelectric eye which controls the means for pivoting the pins.

While this type of miniature bowling apparatus has had wide acceptance, it lacks the thrill which comes to a bowler when he hears and sees the ball actually striking the pins.

One object of the present invention is to provide a bowling apparatus which will permit a person to bowl a game in a confined space that more nearly simulates an actual bowling game than is possible with conventional miniature bowling apparatus.

Another object of the invention is to provide apparatus of the character described in which a ball may be used actually to knock down pins, as in the standard bowling game, and in which the pins will automatically be reset.

Another object of the invention is to provide a fully automatic mechanism, particularly for use in a confined space, but usable, also, on a regulation bowling alley, for picking up the ball, sweeping pins off the alley, separating the ball from the pins, resetting the pins, and for performing all of the operations that are performed by an automatic pin-setting apparatus on a regulation bowling alley.

A further object of the invention is to provide an automatic pin-setter which will be simpler in construction and operation than prior types of such automatic equipment.

Other objects of the invention will be apparent hereinafter from the specification and from the recital of the appended claims.

One embodiment of the invention is illustrated in the accompanying drawings.

In this apparatus there are three endless belts mounted at the back of the alley, one of which travels upwardly to carry the ball and pins upwardly off the alley, another of which travels across the alley to receive pins from the first-named belt and to deliver them to a third belt which travels in a back-to-front direction to deliver the pins into cups on a rotatably indexable table. This table is adapted to be indexed step-by-step as each pin drops off the third belt into successive cups of the table. When there are ten pins in the cups, the cups are opened to drop the pins into chutes through which they drop into cups of a rack that is vertically movable to set the pins on the alley deck or floor. Rods disposed beneath the cups of the rack retain the pins in these cups until they are to be set on the deck or floor. The belts are driven continuously during operation of the machine except for the brief periodic intermissions when pins are being dropped from the cups of the table through the chutes into cups of the rack.

When a ball is rolled down the alley floor or deck it strikes an apron hanging just beyond the floor or deck and trips a limit switch that closes a circuit to a solenoid-actuated latch. This disengages the latch which has been holding the rack in its upper position. The rack will then descend by gravity.

The rack has four pairs of rods mounted on it in parallelism. These rods serve not only to retain the pins in the cups of the rack until it is desirable to release them; but they also serve to sense and to pick up pins off the alley floor if pins are left standing after the rolling of the first ball of a frame. There is one pair of these rods positioned in the rack to pick up off the alley the No. 1 pin, one pair for the No. 2 and No. 3 pins, one pair for the No. 4, 5 and 6 pins, and a fourth pair for the No. 7, 8, 9 and 10 pins.

If the ball was the first ball of a frame, as the rack descends, the two rods of each pair of rods are first moved away from each other to straddle the pins which have been left standing on the alley floor or deck. Then they are moved together to grip these pins. Then the rack ascends, lifting these pins off the alley floor.

On one rod of each pair there are as many trip members pivotally mounted as there are pins to be picked up by that pair of rods. With each trip member there is associated a limit switch. The trip members sense whether there are any pins left standing on the alley after the rolling of the first ball of a frame, and the limit switches register accordingly.

When the sensing operation has been completed, the rack ascends, carrying with it any pins which were left standing, and which are now held in the gripper rods.

The sweep motor is then started, causing the sweep to sweep the pins left on the alley into the pit at the rear of the alley where they are picked up by the upwardly traveling belt which delivers them onto the cross belt, which in turn delivers them onto the forwardly-traveling belt. The ball is also picked up by the upwardly traveling belt, but is separated from the pins when the forward reach of this upwardly traveling belt reaches the limit of the upward travel. The ball returns to the front of the alley.

As the sweep approaches the end of its return movement, it trips a switch which causes the latch for the rack to again become disengaged; and the rack descends again to reset the pins which had previously been picked up by the gripper rods. The pins are now in place ready for rolling of the second ball of the frame.

If there are no pins left standing after the rolling of the first ball of a frame, that is, if the first ball is a strike ball, the rack will descend as before, but no pins will be sensed by the gripper rods; and no pins will be picked up by them. The sweep will, however, operate, as before, after the rack ascends, to sweep the fallen pins off the alley; and at the end of its travel it trips, as before, a switch which actuates the solenoid that disengages the latch and allows the rack to descend again but with a complete new set of pins that have been placed in the cups of the rack. The cups of the rack are arranged in triangular fashion corresponding to the triangular arrangement in which the pins are required to set up on the alley for bowling, so that when the pins drop out of these cups onto the alley they are in correct position for bowling.

When the second ball of a frame is rolled, an electrical circuit will be closed, as soon as the ball trips the limit switch behind the pit apron, which will start the sweep motor, by-passing the pin-sensing operation. A whole new set of pins will be set up on the alley, then, as soon as the sweep has completed its operation.

In the drawings:

FIG. 4 is a fragmentary plan view taken in a plane below the plane of FIG. 2 and showing the cups in the rack which receive the pins from the delivery chutes of the machine, the rods for sensing and gripping the pins, and parts associated therewith;

FIG. 5 is a fragmentary perspective view showing how the rods grip each pin, and showing, also, the sensing means for detecting the presence or absence of a pin in a particular position on the alley;

FIG. 6 is a section on an enlarged scale taken on the line 6—6 of FIG. 4 looking in the direction of the arrows;

FIG. 10 is a section taken on the line 10—10 of FIG. 2 looking in the direction of the arrows;

FIG. 11 is a section on the line 11—11 of FIG. 2 looking in the direction of the arrows;

FIG. 18 is an electrical diagram, showing one way in which the machine may be wired to accomplish its purpose.

Figure 1:
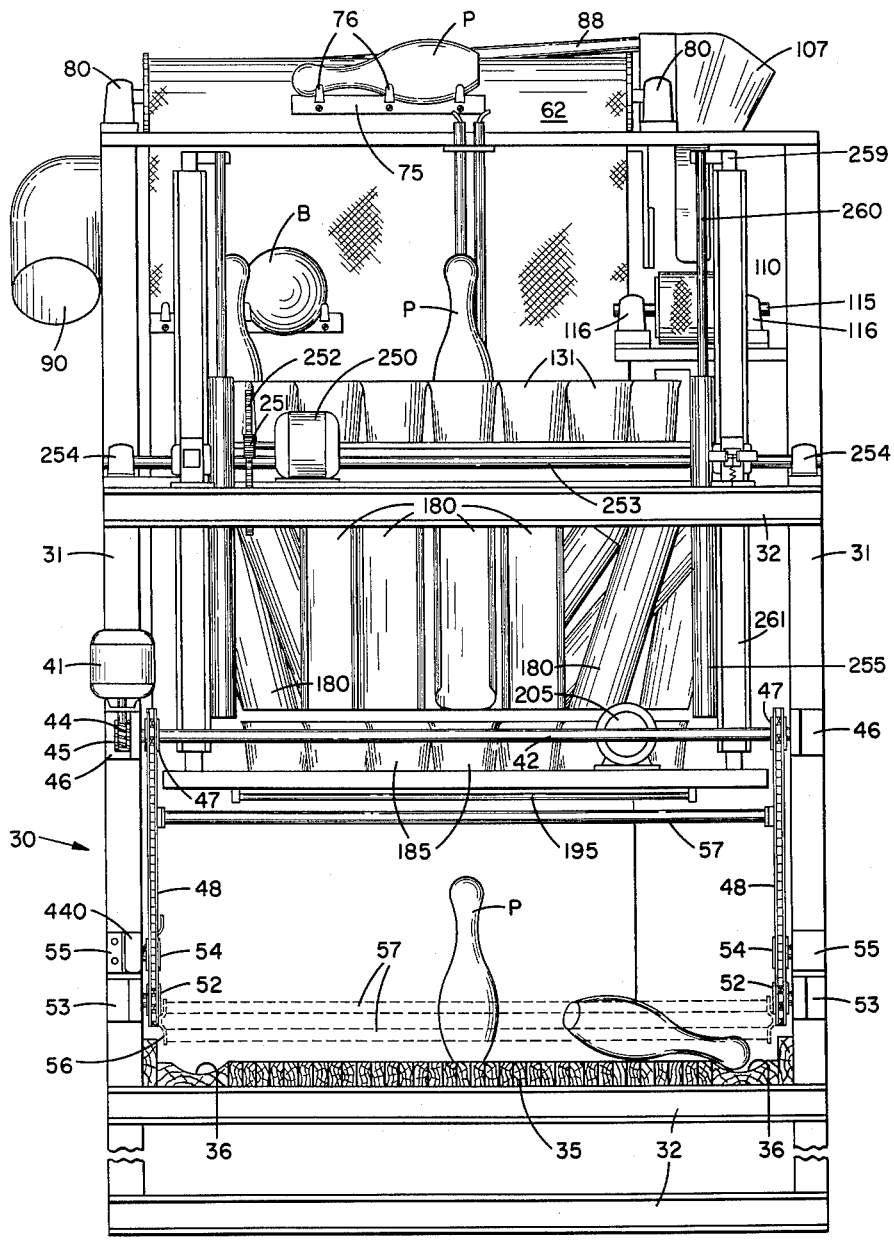
FIG. 1 is a front elevation of a pin-setting machine, built according to one embodiment of the invention, several pins being shown in different positions at different stages of operation of the apparatus.

Reference will now be made to the drawings by numerals of reference for a more detailed description of the illustrated embodiment of the invention. 30 denotes the framework of the machine. This comprises a plurality of uprights 31 (FIGS. 1 and 3), cross bars 32, and logitudinally-extending straps 33 (FIGS. 1 and 3), all bolted or welded together to make a strong, rigid support for the operating parts of the machine.

35 denotes the deck or floor of the alley. The pins are set on this deck or floor, and the ball is rolled by the bowler over this deck or floor in an attempt to knock down the pins. The floor serves, in the apparatus of the present invention, a similar purpose to the floor of a regulation bowling alley. It is, however, much shorter and much narrower than the floor of a regulation bowling alley. Furthermore, it is supported at an elevation above the floor of the tavern or hall, in which the machine is used, so that the bowler will be able to play the game without bending over. The height of the floor 35 above the floor of the hall or tavern is approximately the same height as the floor of a miniature shuffleboard court would be disposed above the floor of the hall or tavern in which it is used. The base of the apparatus rests directly on the floor of the hall or tavern in which the apparatus is used, with the floor of the apparatus disposed above the floor of the hall or tavern so that the bowler will be able to play the game comfortably without bending over unnecessarily. Gutters 36 are provided at opposite sides of the deck or floor 35 as in a conventional bowling alley.

Mounted on a bracket 40 (FIG. 3) which projects forward from one of the front uprights 31 of the frame 30, is a motor 41. This motor drives a shaft 42 (FIGS. 1 and 3) through a worm 44, that is secured to the armature shaft of the motor, and a worm wheel 45 which is keyed or otherwise fixedly secured to the shaft 42. The shaft 42 is journaled adjacent opposite ends in brackets 46 that are secured to the front uprights 31 of the machine.

Mounted adjacent opposite ends of the shaft 42 are sprockets 47 which serve to drive endless chains 48. The chains 48 wrap around the sprockets 47 and sprockets 49 which are journaled in brackets 50 that are secured on uprights 31 of the machine which are disposed rearwardly of the front uprights 31. Between their ends, the chains pass over idler sprockets 52 that are journaled in brackets 53 which are secured to the front uprights 31, and over other idler sprockets 54 which are journaled in brackets 55 also secured to the front uprights 31 of the machine.

Mounted on one link of each chain 48 is a plate 56. The plates of the two chains are aligned, as shown in FIG. 1; and between them are mounted a pair of rods 57. These rods are mounted parallel to one another and extend transversely across the alley and constitute the sweep of the machine.

Figure 3:
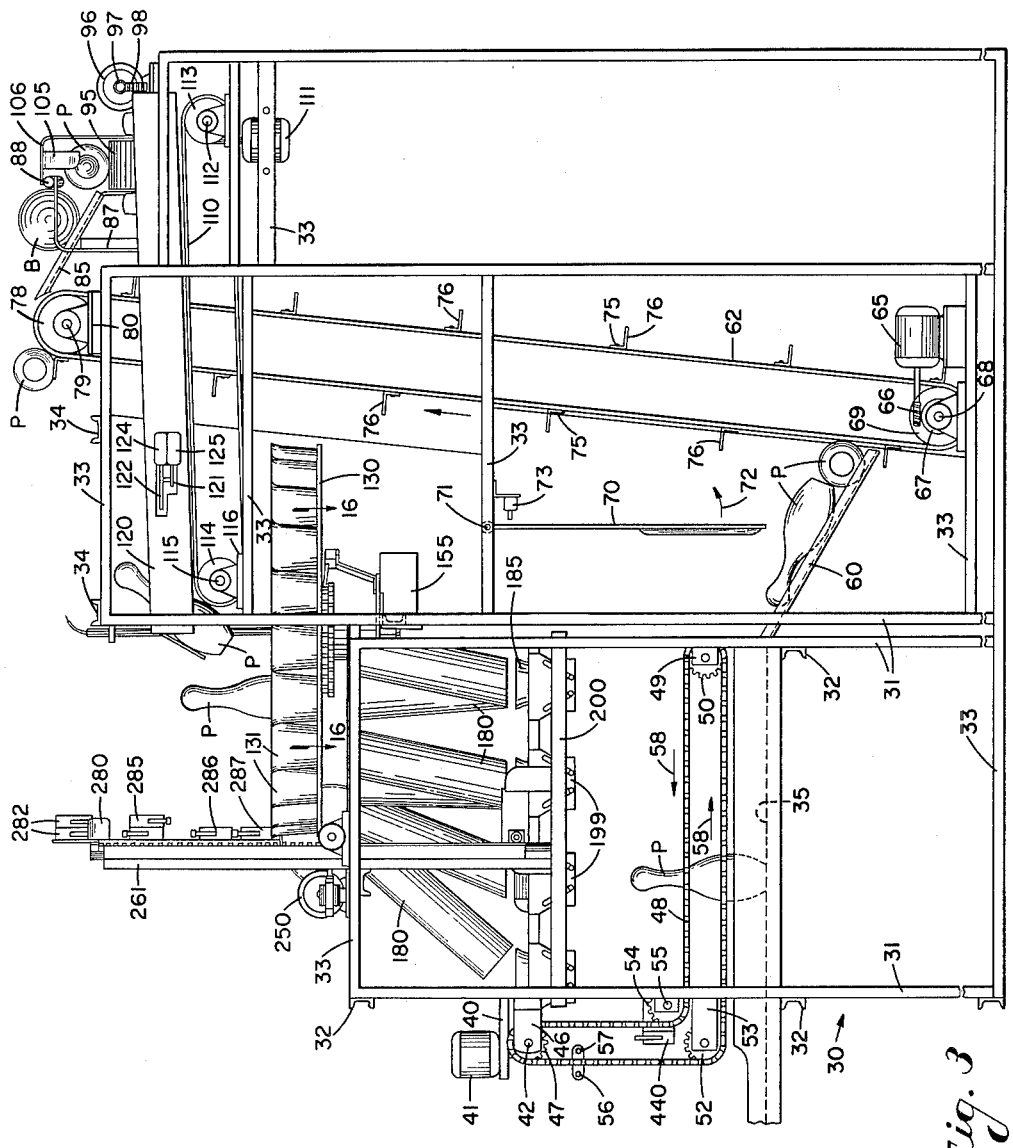
FIG. 3 is a side elevation of this machine.

When the motor 41 is in operation, the endless chains 48 are driven as indicated by the arrows 58 in FIG. 3; and the rods 57 are moved downwardly from the position shown in FIG. 3 until they are adjacent the deck or floor 35, as shown in dotted lines in FIG. 1, and then are moved rearwardly to sweep off the floor or deck 35 and out of the gutters 36 and onto an inclined plate 60, any pins left on the floor 35, or in the gutters 36, after a ball is rolled.

The inclined plate 60 is welded or otherwise secured to a pair of opposed uprights 31 of the machine, and is disposed to direct the ball, and any pins swept off the floor and the gutters onto an endless conveyor belt 62 which is inclined slightly rearwardly from the vertical.

This belt is adapted to be driven by a motor 65 (FIG. 3) which is mounted on a rail 33. A worm 66 on the armature shaft of this motor meshes with and drives a worm wheel 67, which is secured to a shaft 68 to which there is keyed or otherwise fastened a pair of pulleys 69, at opposite sides of the machine, respectively, which serve to drive the belt 62.

Suspended from two opposed longitudinally-extending straps 33 of the frame, above the inclined chute 60, is a bumper apron 70. This apron is pivoted as denoted at 71 on a pair of rails 33 of the frame. It is of a width corresponding to the width of the floor and gutters, so that when a ball is rolled on the floor, it will strike this apron, rocking it counterclockwise, as denoted by the arrow 72 in FIG. 3 to trip the limit switch 73, as will be described further hereinafter.

Figure 15:
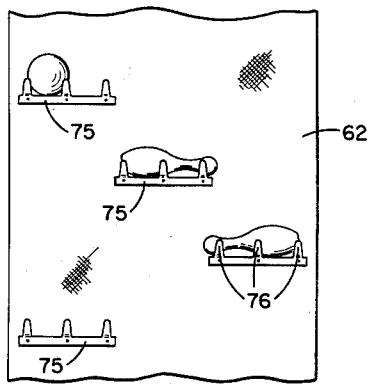
FIG. 15 is a fragmentary elevation of the upwardly moving pin and ball elevating belt.

The endless belt 62 has a plurality of brackets 75 (FIGS. 3 and 15) riveted or otherwise secured to it, each of which has three transversely spaced fingers 76 that project at right angles to the path of travel of the belt. Successive brackets are secured to the belt 62 so as to be displaced both in the direction of travel of the belt and laterally of the belt relative to one another as shown in FIG. 15. In the particular embodiment illustrated, the brackets are arranged in series of three, the brackets of each series being displaced both in the direction of travel of the belt and laterally from one another, and each fourth bracket being aligned in the direction of travel of the belt with the fourth preceding bracket. Aligned brackets are spaced apart further than the height of a pin so as to prevent jamming of pins between them. The fingers 76 are close enough together laterally to prevent a ball from dropping between them; and together the fingers of any bracket will carry a ball or pin upwardly, as shown clearly in FIGS. 2 and 15.

At the upper limit of its travel, the belt 62 passes over an idler pulley 78 (FIG. 3) which is secured to a shaft 79 that is journaled at opposite ends in pillow blocks 80 which are secured on strap members 33 of the frame.

Disposed adjacent the uppermost part of the belt 62 is an inclined plate or chute 85 (FIGS. 2 and 3) which has slots 86 cut into it along the edge thereof which is adjacent to the belt. These slots permit the fingers 76 of the brackets 75 to pass through but strip the ball and the pins from the belt. The ball and pins then roll down the incline or chute 85.

Secured to the frame of the machine at one side thereof is a right angular shaped bracket 87 (FIGS. 2 and 3) to which there is fastened a rearwardly and downwardly inclined rod 88. This rod is disposed close enough to the inclined plate or chute 85 as to prevent the ball from passing under it, but is spaced far enough from the inclined plate or chute to permit pins to roll under it. The ball is guided by the rod 88 to one side of the machine where it rolls into the return chute 90 (FIGS. 1 and 2) to return to the front of the machine for reuse.

The pins rolling down the chute 85 and under the rod 88 drop onto an endless belt 95 (FIG. 2) which travels across the machine from side to side adjacent the back thereof. This endless belt is driven by a motor 96 through a worm 97 and wormwheel 98. The wormwheel 98 is secured to a shaft 99 that is journaled in a pillow block 100 which is secured on the machine. Shaft 99 carries a pulley (not shown) which drives the belt 95. The opposite end of the belt passes over an idler pulley (not shown) which is secured on a shaft 101 which is journaled in pillow block 103.

As the pins travel along the belt 95, they pass under a flexible metal strap or deflector 105 which is riveted beneath a bracket or cover plate 106. This strap or deflector 105 cooperates with a curved deflector or guide 107 (FIGS. 1 and 2) so that when the pins drop off the belt 95 at the right hand end of this belt, they are pivoted so that they will travel butt end forward onto a third belt 110.

The belt 110 is another endless belt which is mounted adjacent the right hand end of the belt 95 and which is disposed to travel from back to front in the machine. This belt 110 is adapted to be driven by a motor 111 (FIG. 3) which is mounted vertically on a strap 33 of the frame, and whose armature shaft carries a worm (not shown) that meshes with a wormwheel (not shown) which is secured to a shaft 112 to which there is fastened a drive pulley 113 for the belt 110. This belt travels at its forward end over a pulley 114 which is secured to a shaft 115 that is mounted in pillow blocks 116 supported on straps 33 of the frame.

Figure 2:
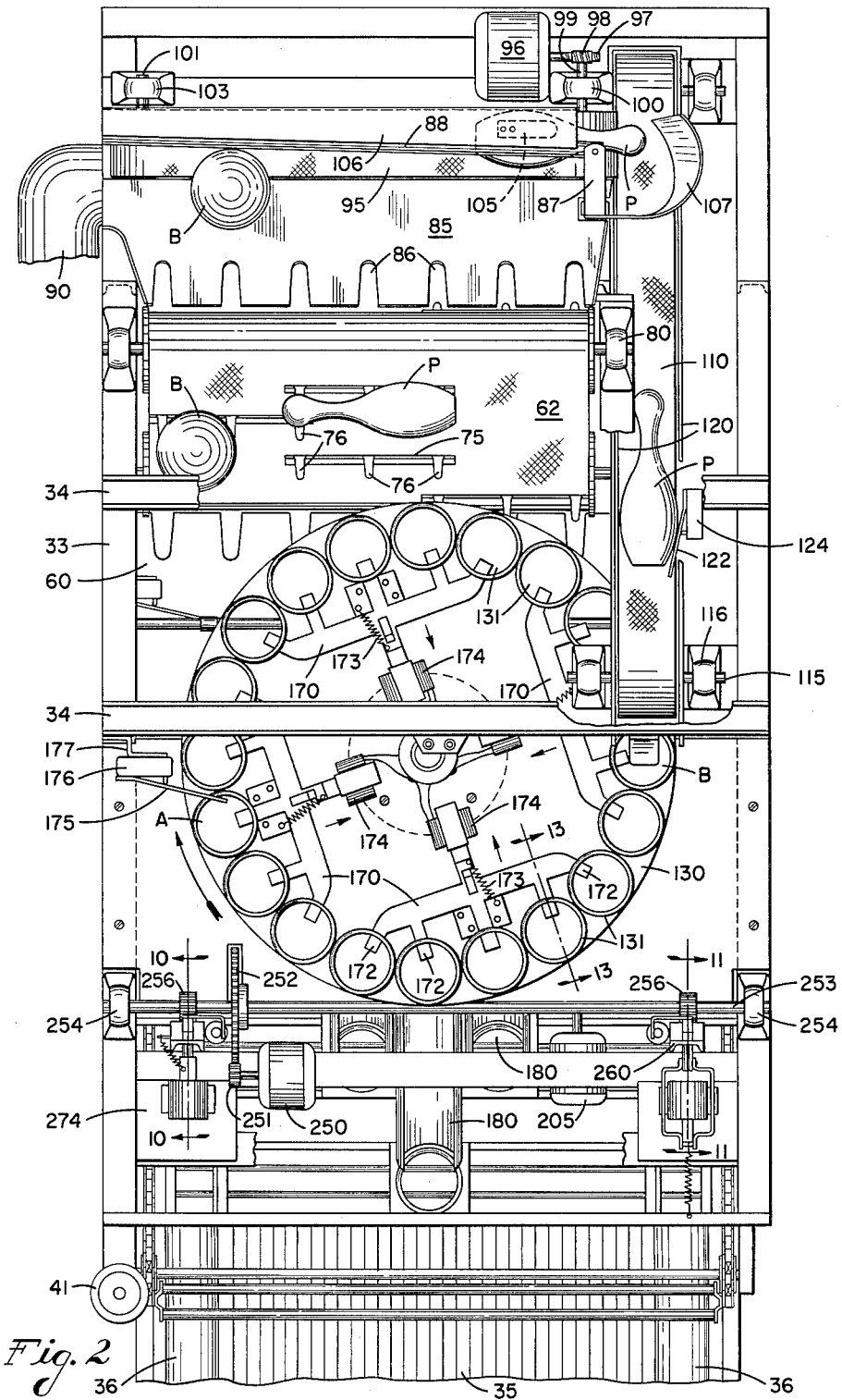
FIG. 2 is a plan view of this pin-setting machine.

The belt 110 travels between two parallel plates 120. Mounted on one of these plates to project through a slot 121 in this plate into the path of pins traveling along the belt 110, as shown FIG. 2, is a flexible strap 122 which is disposed to trip limit switches 124 and 125 that are also mounted on this plate. These limit switches control the unlocking and indexing of a rotary pin-receiving table 130 as will be described further hereinafter.

Figure 17:
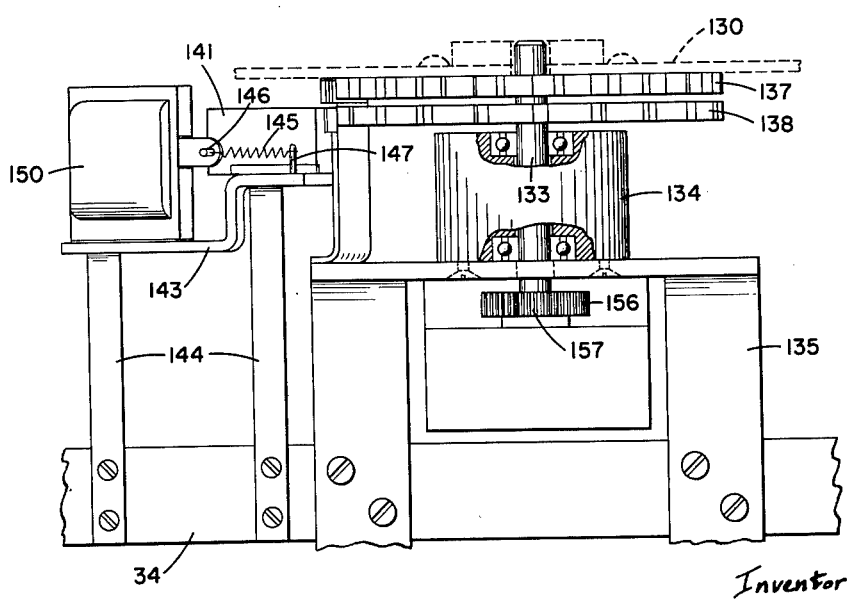
FIG. 17 is a side elevation of this mechanism, parts being broken away.

The table 130 is mounted on the frame beneath the forward end of the belt 110 (FIGS. 2 and 17). Around the marginal edge of this table there are mounted a plurality of pin-receiving cups 131 (FIGS. 1, 2 and 3). The table is secured to a shaft 133 (FIG. 17) which is journaled in a support 134 that is fastened upon a bracket 135 which is secured to one of the transverse members 34 of the frame.

Figure 16:
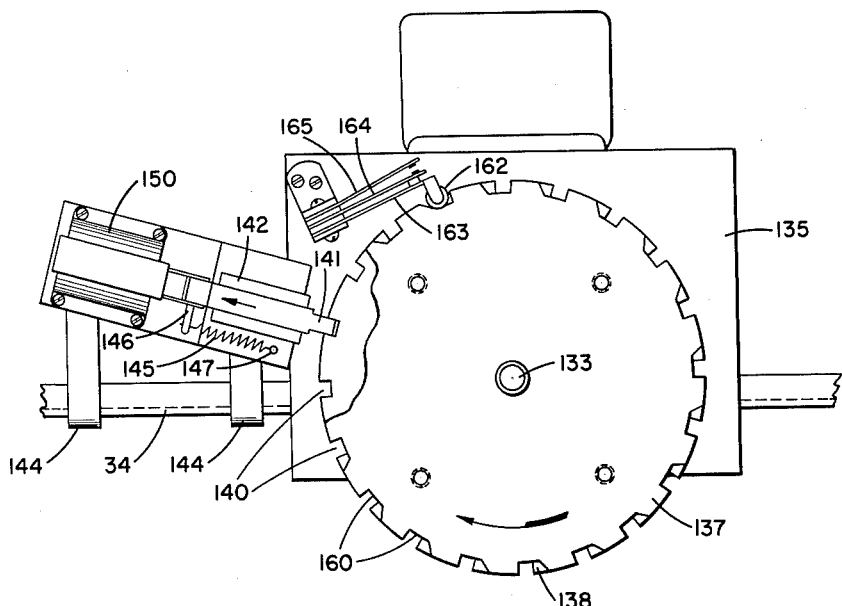
FIG. 16 is a fragmentary plan view showing the indexing mechanism for the rotary pin table.

Fixedly secured to the shaft 133 are two notched plates 137 and 138 (FIGS. 16 and 17). The plate 138 is provided with a plurality of equiangularly spaced notches 140 which are adapted to be engaged successively by a locking dog 141. This dog is reciprocable in guide ways 142 that are mounted on a bracket 143. This bracket is carried by straps 144 from one of the transverse bars 34 of the frame. The locking dog 141 is constantly urged toward engagement with the plate 138 by a coil spring 145 which is secured at one end to a pin 146 and at its opposite end to a pin 147. The pin 146 is secured to the armature of a solenoid 150 that is mounted on the bracket 143. The pin 147 is secured on bracket 143. The solenoid 150 is adapted to be energized to retract the locking dog 141 from engagement with the notched plate 138 when the limit switch 124 (FIGS. 2 and 3) is tripped by contact of a pin engaging the flexible release spring 122 as the pin travels on the belt 110. When this flexible member 122 trips the limit switch 125, a circuit is closed to the motor 155 (FIG. 3) which drives the spindle 133 through the gearing 156, 157 (FIG. 17). The two limit switches 124 and 125 are arranged so that solenoid 150 is energized to withdraw dog 141 just an instant before the motor 155 is started.

The plate 137 is provided with a plurality of equiangularly spaced notches 160. One side of each notch 160 is inclined and the other side is substantially radial of the axis of shaft 133. The roller 162 is secured to one arm 163 of a flexible switch comprising the arm 163 and two arms 164 and 165. As the plate 137 rotates, the roller 162 rides up out of a notch 160 onto the periphery of the plate, thereby maintaining a circuit to the motor 155. When the roller comes to the next notch in the plate 137 it drops into the notch, breaking this circuit again, stopping the motor.

Figure 13:
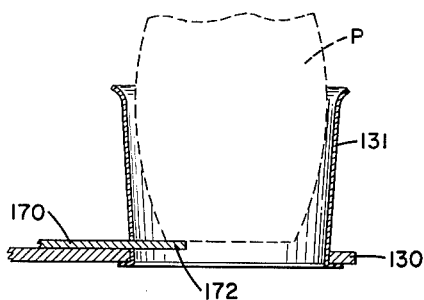
FIG. 13 is a fragmentary sectional view on an enlarged scale taken on the line 13—13 of FIG. 2 looking in the direction of the arrows.

The cups 131 (FIGS. 1, 2, 3 and 13) are open at their bottoms; and the pins are held in the cups by stop members 170 (FIGS. 2 and 13). In the embodiment of the invention shown, there are twenty cups 131 mounted in the table 130; and there are four stop members 170 reciprocably mounted on the table. Each of these stop members has five fingers 172 (FIGS. 2 and 13) integral therewith. One of these fingers 172 is adapted to extend through a slot in each of the cups 131 into a position, such as shown in FIG. 13, to prevent a pin P from dropping through the associated cup 131. The stop or detent members 170 are constantly urged toward operative position by coil springs 173, and are retracted when the solenoids 174 are energized.

The table 130 is adapted to be indexed step-by-step, as described above, as each pin P passes by and actuates the flexible trip member 122 (FIG. 2) and drops into a cup 131. When the ten pins have been dropped into ten of the cups 131, the first of these pins will have arrived at the position denoted at A in FIG. 2, and will actuate the flexible trip member 175 to trip the limit switch 176 closing a circuit to the solenoids 174, retracting the detents or stops 170, and allowing the ten pins in the cups 131 to drop through the cups. The limit switch 176 is carried by a bracket 177 from one of the transverse members 34 of the frame.

Instead of solenoids 174, a motor might be used to retract and advance detents 170 through gearing driven by the motor. The motor could be started and stopped by tripping limit switch 176.

Disposed beneath the ten cups 131 between the positions marked A and B in FIG. 2 are ten chutes 180 (FIG. 3). These guide the pins P, when they drop from the cups 131, into ten cups 185 (FIG. 4). The cups 185 are mounted in blocks 186 that are rigidly secured in an open framework or rack 187 comprising the blocks 186, cups 185, parallel transverse bars 188, longitudinally extending bars 189, parallel straps 191, and a rectangular enclosing frame 190, as shown in FIG. 4. The cups 185 are arranged in this framework in the same relationship as are the pins P when set upon the alley floor or deck at the start of a game. There is one cup in the front of the frame work, two cups behind that, three cups behind the two, and four cups behind the three, all arranged in a generally triangular formation.

Mounted beneath the rack 187 is a second rack denoted as a whole at 200. The two racks are movable vertically relative to one another through a limited distance, as will be described further hereinafter, to open or close the rods, which grip and lift standing pins, and which act also as stops preventing pins from falling out of cups 185. The two racks travel together after they have moved relative to one another to the extent of the permitted lost-motion between them.

Mounted in the second rack 200 beneath the single cup 185 at the front of the frame work and extending in parallelism transversely of the frame work are a pair of rods 195. Similar pairs of rods 195 are disposed beneath the two cups 185 in the second tier of the frame work; and similar pairs of rods are disposed beneath the three and the four cups, respectively, arranged in the third and fourth tiers of the frame work, respectively.

Figure 14:
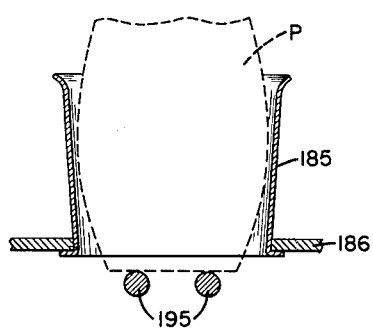
FIG. 14 is a fragmentary section of a chute showing the relation of the pin gripping rods thereto.

The rods 195 serve two functions. When they are in the position shown in FIGS. 4 and 14, they prevent pins P from dropping out of the cups 185; and when they are spread apart, or opened, they permit the pins to drop through these cups onto the alley floor. When the frame work is lowered, after the first ball of a frame of the game has been rolled, these rods also sense and pick up any pins left standing on the alley.

The two rods 195 of each pair extend at each end through two aligned, straight, horizontal slots 196 (FIGS. 7 and 8) in a plate 197 that is fastened to transverse members 201 of the rack 200. The two rods 195 of each pair also extend at their corresponding ends through two upwardly diverging, inclined slots 198 formed in plates 199 that are fastened to the straps 191 of the rack 187 to depend therefrom.

Figure 7:
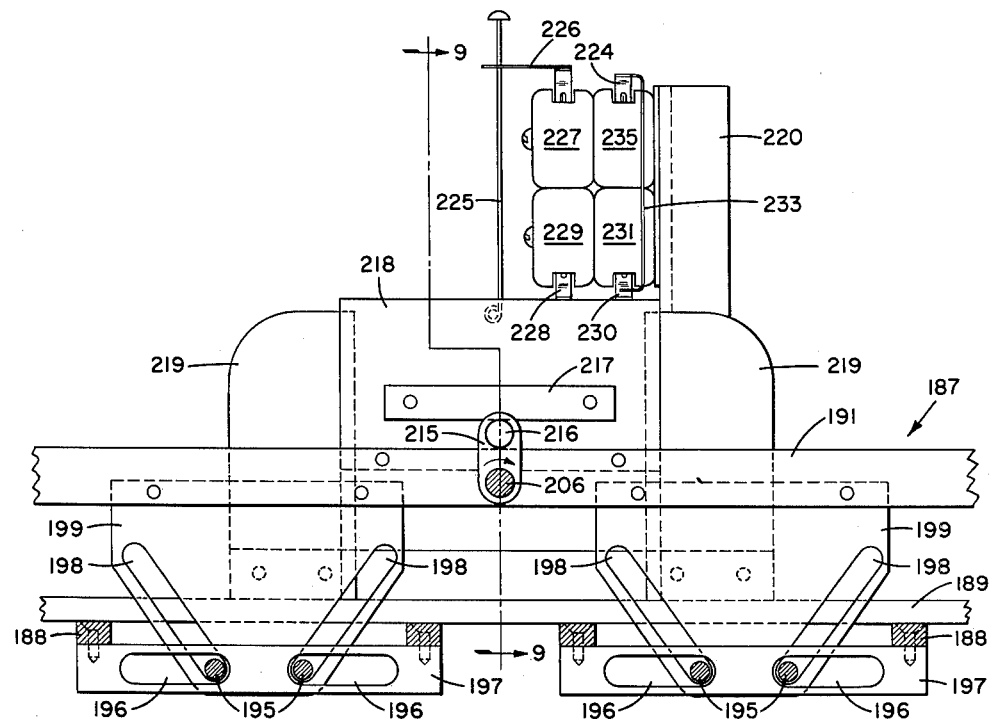
FIG. 7 is a section on an enlarged scale taken on the line 7—7 of FIG. 4 looking in the direction of the arrows, the gripping rods being here shown in pin-gripping position.
Figure 8:
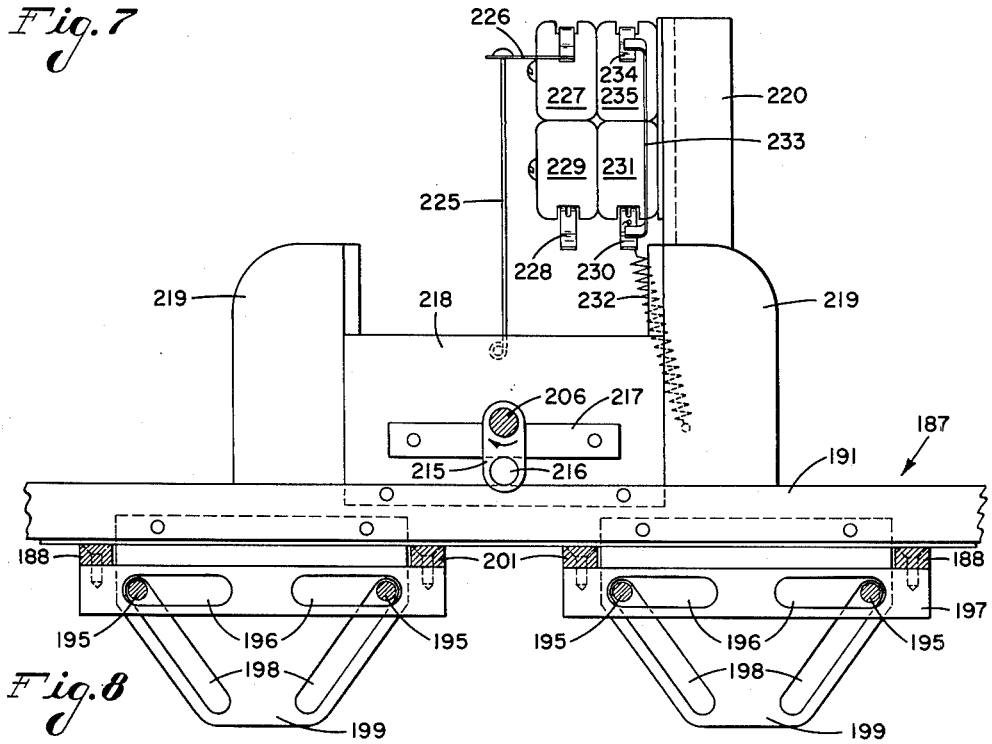
FIG. 8 is a section similar to FIG. 7 but showing the gripping rods in pin-releasing position.

As will be clearly seen from FIGS. 7 and 8, when the rack 187 is moved downwardly relative to the rack 200, the two rods 195 of each pair will be moved away from each other. This opens up the pair of rods so that they can either be in position at opposite sides of a pin, or pins P, ready to be moved together to grip the pin or pins, or so that, if there is or are a pin or pins in the cup or cups 185 above that particular pair of rods, that pin, or those pins, can drop through the cups, between the opened rods, onto the deck or floor of the alley. The action depends, of course, upon the status at the time of the game being bowled.

After the first ball of a frame is rolled, the rack 187 is lowered to open up the rods 195, and then the racks 187 and 200 travel downwardly together to a limit position determined by a stop, as will be described further hereinafter, until the open rods 195 are abreast of the necks of any pins P left standing on the alley, as shown in FIG. 5. Then the rack 187 is raised again, to close the rods 195 on any standing pins. Then the racks 187 and 200 travel upwardly together to the limit up position of the racks. Thus, the pins left standing are picked up off the alley, so that the sweep can thereupon operate to remove from the alley any pins knocked down. Since each pair of rods extends across the full width of the alley, the pair can pick up the pin or pins disposed between them, even if those pins have been knocked "off-spot," that is out of correct positions by a ball. The rods will not release the picked up pins until those pins have been returned to the alley. Therefore, the rods will reset the pins "off-spot" or "on-spot" depending upon the positions which the pins occupied when the rods came down to sense them. This "on-spot" and "off-spot" resetting is a distinct advantage.

The movement of the rack 187 relative to the rack 200 is effected by operation of a motor 205 (FIG. 4), which drives a shaft 206 through a pair of bevel gears 207. This shaft is adapted to be rotated 180° at a time to move the rods 185 either apart, or together, depending upon whether the shaft is traveling through one half or the other half of its full circle of rotation. There is a cam 211 secured to the shaft 212 (FIG. 6) of motor 206°, which operates a limit switch 208 through a flexible trip member 209. The cam 210 has two diametrally opposed recesses 210 in its periphery; and the trip member 209 is adapted to drop into one or other of these recesses after the cam has been rotated 180°.

As will be described further hereinafter, the motor 205 is started by closing a limit switch which is immediately thereafter opened again. The impulse given the motor, however, is sufficient to carry the flexible trip member 209 out of a notch 210 onto the periphery of cam 207. This causes limit switch 208 to close to reestablish the circuit to the motor, so that the motor continues to run until the other notch 210 in cam 207 arrives abreast of trip member 209. When the trip member drops into this other notch 210 it disengages limit switch 208 and the motor is stopped.

Figure 9:
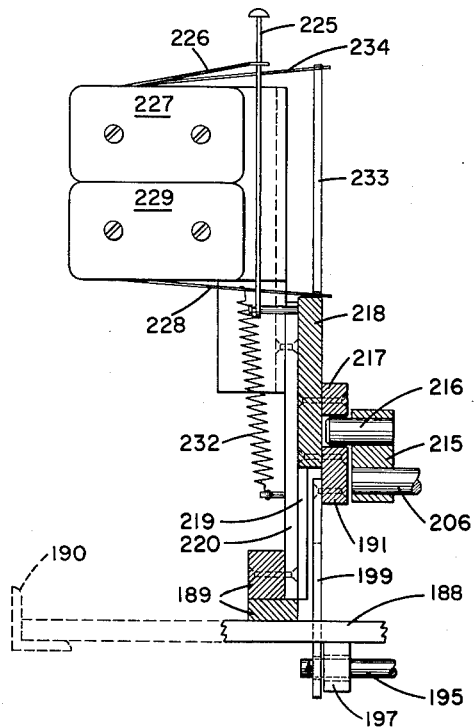
FIG. 9 is a section on the line 9—9 of FIG. 7 looking in the direction of the arrows.

The shaft 206 carries a crank arm 215 (FIGS. 7 and 8) which carries a crank pin 216 that engages between one of the bars 191 of the rack 187 and a block 217 that is fastened to a slide 218. It is the crank arm 215 and crank pin 216 which determines whether rack 187 is moved toward or away from rack 200. On one half of the revolution of shaft 206, the crank moves the racks toward one another to separate rods 195. On the other half revolution the racks are moved apart to close each pair of rods 195. The slide 218 reciprocates in guideways 219 that are fixed to a plate 220 which in turn is secured by straps 221 (FIG. 9) to one of the cross members 33 of the frame of the machine.

There is a headed rod 225 connected to the slide 218. At the end of the downward travel of the slide 218, this rod is adapted to engage an arm 226 to trip a limit switch 227 to start a motor 250 (FIGS. 1 and 2) which is adapted to drive the racks 187 and 200 upwardly, as will be described further hereinafter. At the end of its upward travel, the slide 218 engages and trips the arm 228 of a limit switch 229, and the arm 230 of a limit switch 231 to stop motor 250 as will be described further hereinafter. The arm 230 is constantly urged in one direction by a coil spring 232 (FIG. 8); and it is operatively connected by a strap 233 to the arm 234 of a limit switch 235. The purpose of these limit switches will appear hereinafter.

Mounted on one rod 195 of each pair of such rods, for each cup 185 (FIG. 4) associated with that pair of rods, is a pair of depending arms 240 (FIG. 5). Mounted between each pair of arms 240 is a thin wire rod 241. Secured in one arm of each pair of arms 240 is a stud 243 which is positioned to engage and to be engaged by the arm 244 of an associated conventional limit switch 245. There is one of these limit switches associated with each pair of arms 240. The springs of each limit switch tends to urge the associated limit switch arms 244 counterclockwise, as viewed in FIG. 5, thereby urging the associated pair of arms 240 and the associated rod 241 about the axis of the rod 195, on which they are mounted, in a clockwise direction, as viewed in FIG. 5, when there is no pin P between these arms and the companion rod 195 to that on which the arms are mounted. However, when there is a pin between a pair of arms and the rod 195, which is associated with that on which the arms 240 are mounted, the arms are swung counterclockwise by the pressure of the pin P to cause associated stud 243 to rock associated arm 244 to actuate the associated limit switch 245. The limit switches 245 are mounted on cross plates 246 which are fixed to the rack 187. The limit switches 245 determine whether a whole new set of pins is to be set up on the alley floor or deck, or whether pins previously picked up by the rods 195 are to be reset on the floor or deck, as will be described further hereinafter.

Instead of using ten switches 245, one for each pin, four only can be used, one for each pair of rods 195. A pin 243 (FIG. 5) in one rod of each pair might then rock a rod running all the way to one side of the machine and actuating a single switch 245 for that pair of rods 195. Since there are only four pairs of rods 195, only four limit switches 245 would be required with this arrangement.

The racks 187 and 200 are raised and lowered by operation of the motor 250 (FIGS. 1 and 2), previously mentioned. The armature shaft of this motor carries a pinion 251, which drives a gear 252 that is fastened to a shaft 253, which is journaled in pillow blocks 254 on the frame of the machine. This shaft has pinions 256 (FIGS. 2, 10 and 11) secured to it adjacent its opposite ends which mesh with racks 257 that are riveted to juxtaposed bars 258 and 259. The bars 258 and 259 slide in guideways 261 and 262, respectively.

The guideway 261 has a slot 263 in it, through which a latch or detent 265 can project to engage selectively in one or other of two notches 267 provided in the back of the bar 259. This detent 265 is the armature of a solenoid 269, which is wired in the circuit of the limit switches 245, so that when all of the limit switches 245 are tripped, that is, when all of the pins have been knocked down by the first ball of a frame, this catch will be withdrawn so that the racks 187 and 200 can drop down to the full limit of their downward movement, as shown in dotted lines in FIG. 10, that is, until the detent 265 engages in the upper notch 267 of the bar 259. This permits a new set of pins to be placed upon the alley from the cups 185. The catch or detent 265 is constantly urged toward operative position by a coil spring 271, and is disengaged by energization of the solenoid 269. To prevent too fast drop of the racks, air buffers are provided. These comprise cylinders 255 (FIG. 1), which are secured to the frame, and pistons 260, that travel in the cylinders and that are secured to bars 259.

The guideway 262 has a slot 264 in it, through which a catch or detent 266 (FIG. 11) can extend into position to engage a notch 268 in the bar 260, to limit the downward movement of the racks 187 and 200 to the dotted line position shown in FIG. 11. This is the position when the racks are dropped to sense what pins are left standing on the alley, and the position to which the racks return when those pins are to be reset, after the sweep has removed the fallen pins from the alley and the gutter. The catch or detent 266 is moved to operative position by energization of solenoid 270, and is constantly urged toward retracted, inoperative position by the coil spring 272. The solenoids 269 and 270 are supported by plates 284 from the frame of the machine.

Figure 12:
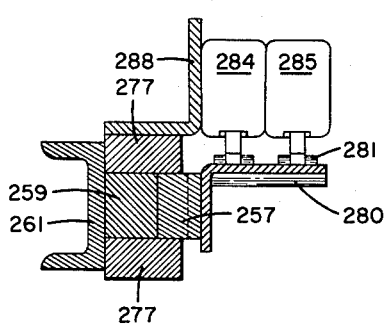
FIG. 12 is a fragmentary sectional view on a somewhat enlarged scale taken at right angles to the views of FIGS. 10 and 11 and showing further the trip mechanism operated by the rack which lowers and raises the pin-detecting and pin-setting mechanisms.

The bars 258 and 259 travel in guides 277 (FIG. 12). Mounted on the rack 257 (FIG. 10 and 12) is a trip member 280, which projects to one side of the rack 257 in the position to engage the arms 281 of the limit switches 282, 284, 285, 286, and 287, (FIG. 10). These limit switches are mounted on an angle iron bracket 288 which is secured to one of the guides 277.

The cycle of operation of the machine begins with the pins set on the deck or floor 35, with the racks 187 and 200 raised and everything ready for the rolling of the first ball of the game.

When the bowler rolls the first ball of a frame, it will strike apron 70 (FIG. 3) causing limit switch 73 to energize solenoid 269 (FIG. 10) and solenoid 269 will disengage catch 265, allowing the racks 187 and 200 to drop by gravity. As the racks descend, trip member 280 (FIGS. 10 and 12) will trip switch 285 causing solenoid 270 to project catch 266 (FIG. 11) through slot 264 in guide 262 and engage that catch in notch 268 of bar 260 to stop the downward movement of the racks when the gripper rods 195 are abreast of the necks of any pins left standing on the alley. The trip member 280 will also trip switch 284 starting the motor 205 (FIG. 6). This will cause crank arm 215 (FIGS. 7 and 8) to be driven a half revolution to close the rods 195 on any pins left standing on the alley.

The upward relative movement of rack 187 relative to rack 200 (FIG. 7) will cause slide 218 to trip limit switches 229, 232 and 235. This will start motor 250 (FIGS. 1 and 2) and the racks 187 and 200 will be raised, and any pins P, which are left standing, will be lifted off the deck or floors 35 by the gripper rods 195.

As the racks rise, trip member 280 (FIGS. 10 and 12) will trip switch 283. This will start sweep motor 41 (FIG. 3). The sweep chains 48 will then be driven to cause sweep bars 56 and 57 to sweep the fallen pins off the floor or deck 35 and out of the gutters 36 into the pit.

The elevator belt 62 (FIGS. 1, 2 and 3) will be running and so will belts 95 and 110. The pins P, like the ball B, will be picked up by belt 62; and at the top of the travel of belt 62 the ball will be separated from the pins P. The ball will return to the front of the alley; and the pins will travel on belts 95 and 110 to the table 130 (FIGS. 2 and 17). As each pin passes trip 122 (FIG. 2) the table will be indexed a step so that a new cup 131 is always presented at the forward end of belt 110 to receive a pin.

When the sweep is approaching the end of its operation, it will trip the limit switch 440 (FIG. 3). This will again retract catch 265 and the racks 187 and 200 will again descend. If there were pins P left standing and picked by the rods 195, these pins will be reset.

If all of the pins are knocked down by the first ball of the frame, no pins will be sensed by the rods 195 on the first descent of the racks. The racks will return to upper position, as before, and switch 282 will be energized so that in conjunction with limit switch 176 (FIG. 2) detents 170 will be moved out of operative positions, allowing a full set of pins to slide from cups 131 down chutes 180 into cups 185 (FIGS. 1, 3 and 4) so that as racks 187 and 200 descend again a new set of pins will be deposited on the alley deck or floor. In this case, limit switches 245 (FIGS. 4 and 5) will operate to prevent energization of solenoid 270 (FIG. 11) and the racks will descend to the dotted line position shown in FIG. 10, where they are arrested by catch 265 engaging in notch 267. Thus, the new set of pins will be placed properly on the alley floor or deck.

After the second ball of a frame is rolled, a cam 355 (FIG. 18) will operate, as will be described further hereinafter, to actuate the sweep first. All of the pins P are then swept off the alley, whether they were knocked down, or not, by the second ball. Then a full new set of pins is released from table 130 (FIGS. 2 and 17) into cups 185 (FIGS. 1 and 3) and the racks 187 and 200 are allowed to descend to the limit down position of FIG. 10 to deposit this full set of pins on the floor or deck. The racks 187 and 200 are then raised again as before; and the game can proceed.

One way in which the machine may be wired to accomplish its purpose is illustrated diagrammatically in FIG. 18. It is assumed that a full set of pins is already on the alley floor.

$L_1$ denotes the main line, the so-called "hot wire." $L_2$ denotes the ground line. To put the machine into operation, the switch 300 must be closed. This may be operated manually, or may be coin controlled through a coin box.

As long as there is not a full set of pins in the table 130 (FIG. 2), the trip member 175 is in the position shown in FIG. 2, and the switch 176 is in the position shown in FIG. 18. When switch 300 is closed, then, a circuit is made from main line $L_1$ through line 330, line 401, the switch arm 400, the line 402, and the relay coil 403 to the ground line $L_2$. This energizes the coil 403 which closes the arms 404 and 405 of this relay. The closing of the arm 405 makes a circuit to the motors 65, 96 and 111, which drive the belts 62 (FIG. 3), 95 (FIG. 2), 110 (FIG. 2). This circuit is from the ground line $L_2$ through the lines 359 and 410, the now-closed relay arm 405, and the line 411, to one side of each of the several motors 65, 96 and 111, the line 412 from the other side of each of these motors, the now-closed switch arm 404 and the line 395 to the main line $L_1$. As long as the switch 300 is closed, then, and the switch 176 is in the position shown in FIG. 18, the belts 62, 95 and 110 will run, and any pins swept off the alley will be carried vertically upward by the belt 62, and across the machine by the belt 95, and forward by belt 110 to the cups 131.

As each pin passes the limit switch arm 122, it trips that switch to cause the motor 155 to index table 130. As soon as switch arm 122 closes, the solenoid 150 (FIGS. 16 and 18) is energized to disengage locking dog 141 (FIG. 16) from index plate 138. As shaft 132 driven by motor 155 starts to rotate, the switch 165 will be closed to maintain the circuit to motor 155. This circuit is from ground $L_2$ through lines 359 and 410, relay arm 405, line 411, motor 155, line 415, switch 165, lines 418, 417, and 412, relay arm 404, and line 395 to main line $L_1$. This circuit will be broken only when roller 162 rolls down into the next notch of plate 137. Then the motor 155 will stop and solenoid 150 will be deenergized to lock the table up again.

When a full set of pins have been placed in the table cups 131, the first of these pins will trip the limit switch 176 (FIG. 2). This will break the circuit to line 412, which feeds the motors 65, 96, 111 and 155 and solenoid 150, and stop these motors and deenergize solenoid 150. The pin carrying belts 62, 95 and 110 will, therefore, be stopped until switch 176 is closed again, and the detents 170 (FIGS. 2 and 13) will be withdrawn to allow the set of ten pins P to drop from the cups 131 into the chutes 180 and thence into the cups 185.

When the first ball of a frame is rolled down the alley or deck 35 and hits the apron 70 (FIG. 3) it closes the limit switch 73. This closes a circuit to the control relay 350 from the main line $L_1$ through the line 351, the switch 73, the line 352, the arm 353 of a mechanically operated relay which is actuated by a cam 355, the line 356, the line 357, the relay 350, and the lines 358 and 359 to the ground line $L_2$. This shifts arms 420, 421, 422, 423, 424, 425 and 426 of the relay, closing them. Thus a circuit is made to the solenoid 269 (FIG. 10). This circuit is from ground $L_2$ through line 302 (FIG. 18), solenoid 269, line 303, contact arm 304 of switch 282, which is at this time held in the position shown in FIG. 18 by trip member 280, line 305, line 306, line 307, contact arm 422 of relay 350, line 309, line 310, contact arm 308 of switch 208, which is at this time in the position shown in FIG. 18, and lines 311 and 312 to the main line $L_1$. This disengages the detent or catch 265 (FIG. 10) from the bar 259, allowing the racks 187 and 200 to drop by gravity.

As the racks descend, the trip member 280 (FIG. 12) disengages the switch 282, allowing the contact arms 304 and 314 of the switch 282 to open, and causing the contact arms 315 and 316 of this switch to close. The opening of the contact arm 304 breaks the circuit to the solenoid coil 269, (FIG. 10) but the catch 265 will simply ride on the bar 259. It cannot engage that bar again until the bar has descended far enough for the notch 267 to receive the catch. This does not happen, of course, on the first ball of a frame.

The trip member 280 passes idly over the switch 284 without actuating anything because the contacts of relay 430 are open, and so is contact arm 342 of switch 208.

When the trip member 280 (FIG. 12) engages the switch 285, a circuit will be made to solenoid 270 from ground line $L_2$ through line 450, solenoid 270, line 451, arm 452 of switch 285, line 453, line 454, now-closed arm 421 of relay 350, and lines 455 and 395 to main line $L_1$. This causes catch 266 (FIG. 11) to be moved into position to engage notch 268 in the descending bar 260, thus stopping the bars 259 and 260 at the position where the rods 195 (FIG. 5) can sense any pins left standing on the deck or floor.

Then the trip member 280 engages and shifts the switch 286 (FIG. 10). This opens the contact arm 320 and closes the contact arm 321. A circuit is then made from the main line $L_1$ through the line 322, the contact arm 321, the line 323, the line 324, the now-closed contact arm 425 of relay 350, the line 325, the contact member 341 of switch 208, the line 326, the line 327, the motor 205 and the line 328 to ground $L_2$.

This starts the motor 205, which rotates cam 207 (FIG. 6) so that the motor can make a half revolution of the cam and then stop. The motor drives the crank arm 215 to cause the slide 218 and rack 187 (FIGS. 7 and 8) to be raised relative to the descending rack 200, thereby to cause the rods 195 to close in gripping engagement with the pins P which have been left standing on the alley.

Wherever there is a pin gripped by the rods 195, the associated limit switch 245 (FIGS. 5, 4 and 18) is tripped. Only two of these limit switches are shown in FIG. 18 although there are actually ten of them, one for each pin.

If there are no pins P left standing, that is, if a strike ball has been rolled, the switches remain open. If any pin is left standing on the alley, the corresponding switch 245 is closed.

As the cam 207 (FIG. 6) revolves, it opens the contact arms 308, 340 and 341 of switch 208 and closes the contact arms 342, 343, and 345 of this switch. When the switch 208 is shifted, a circuit is made to the rack drive mtoor 250 from the line $L_1$, through line 312, line 365, the now-shifted switch arm 342, the lines 366, 367 and 368, the now-closed arm 426 of the relay 350, the lines 370, 371 and 372 to one side of the motor 250, and the line 373 from the other side of the motor to ground $L_2$. Thus, the motor 250 is started to raise the racks 187 and 200 to lift any pins P which have been left standing after the rolling of the first ball of the frame.

As the racks rise they release the switch 285, which allows solenoid 270 to be energized to withdraw catch or detent 266 because relay coil 430 is not energized, and they close switch 284. The closing of the switch 284 closes a circuit to the sweep motor control relay 380. This circuit is from ground $L_2$ through line 359, line 381, and the coil of the relay 380, the switch 284, the line 383, the arm 423 of the relay 350, the line 385, the line 370, the arm 426 of the relay 350, the lines 368, 367 and 366, the now-closed arm 342 of the switch 208, the line 365, and the line 312 to the main line $L_1$.

Energization of the coil 380 closes the arms 390 and 391 of the relay 380. When arm 390 is closed, a circuit is made from ground through line 392 to one side of the sweep motor 41, and from the other side of the sweep motor 41 through the line 393, the now-closed relay arm 390, the line 394, the line 395 to the main line $L_1$. This starts the sweep motor 41 to drive the sweep 57 and sweep the fallen pins off the alley into the pit.

Once relay coil 380 is energized its arms 390 and 391 are held closed by the hold-in circuit from line $L_1$ through lines 441 and 442, arm 443 of switch 440, line 445, arm 391 of the relay 380, and lines 446 and 382, the coil of the relay 380, and lines 381 and 359 to ground $L_2$. This hold-in circuit is broken, however, when member 56 (FIG. 3) carried by the chain 48 trips the switch 440, breaking contact at 443 and making contact through arm 444. This stops the sweep motor.

If all of the pins P were knocked down by the first ball of the frame, none of the switches 245 (FIGS. 4, 5 and 18) will close, and the selector relay 332 will not be energized. Therefore a circuit will be established from ground $L_2$ through line 461, actuating relay 460, lines 462 and 463, arm 334 of relay 332, line 464, arm 444 of switch 440, when switch 440 is tripped by member 56 as described above, and line 441 to main line $L_1$. This will cause arms 467 and 468 of relay 460 to be closed.

Closing of arm 468 will energize relay 470, providing there are ten pins in the cups 131 of table 130 (FIG. 2), because as soon as there are ten pins in these cups, the table will have been indexed far enough for the first-deposited of these ten pins to shift switch 176 by engagement with trip member 175. The circuit to the relay 470 is from main line L₁ through line 330, arm 469 of switch 176, line 471, now-closed arm 468 of relay 460, lines 472 and 473, the coil of the relay 470 and line 359 to ground line L₂. The energizing of relay 470 will close arms 475, 476, 477, 478 and 479 of this relay.

When the racks have ascended to their topmost positions, the trip member 280 (FIG. 12) will return switch 282 to the position shown in FIG. 18. The solenoids 174 (FIG. 2) will therefore be energized to withdraw the detents 170 from the cups 131 and allow the ten pins P to drop from the cups 131 through the chutes 180 into the cups 185. The circuit to the solenoids 174, only one of which is shown in FIG. 18 but which are wired in parallel, is from ground L₂ through the line 480, solenoids 174, line 481, arm 477 of relay 470, line 482, line 303, arm 304 of switch 282, lines 305, 306 and 484, arm 476 of relay 470, and line 367 and 366, now-closed arm 342 of switch 208, and lines 365 and 312 to main line L₁.

At the same time, solenoid 269 will be energized as previously described to snap catch 265 out of engagement with bar 259 and allow the racks 187 and 200 to drop. It takes but an instnat for the pins to drop from cups 131 through the chutes 180; and the rack 187 will not have traveled too far for the pins to land in the cups 185 of rack 187 as they drop out of the chutes 180, even though the racks are dropping by gravity. However, if desired for safety, a limit switch can be put in one of the chutes 180 to be tripped by the pin which drops into that chute and which will prevent energizing solenoid 269 until after the pins have dropped out of the cups 131 of the table. Thus, the racks will not start down until the pins are on their way; and the pins, therefore, will certainly drop into cups 185. As the racks drop, switch 237 (FIGS. 10 and 18) is closed to start motor 205 from line L₁ through lines 550, 551, 552, now-closed contact 479, line 553, line 554, now-closed contact 345, lines 555, 556, 326, and 327 through the motor windings and line 328 to line L₂. The cam 207 (FIG. 6) and crank arm 215 (FIGS. 7 and 8) are, therefore, rotated through half a revolution. In this half revolution, however, the crank arm 216 moves from the position shown in FIG. 7 to that shown in FIG. 8; and the rods 195 are opened to permit the pins P to drop from the cups 185 onto the floor or deck 35 of the alley. The descent of the racks is stopped by catch 263 engaging in notch 267.

In the movement of slide 218 from the position of FIG. 7 to that of FIG. 8, switch 227 is closed by rod 225 and a circuit is therefore made from ground L₂ through line 373, rack motor 250, line 372, now-closed arm 478 of relay 470, line 490, line 310, contact 308 of limit switch 227 (FIG. 7), and lines 311 and 312 to main line L₁. This starts motor 250 to raise the racks 187 and 200 again to up position.

If any pin has been left standing after the rolling of the first ball of a frame, the racks 187 and 200 will be lowered just as described above in the case of the "strike" ball, and just as there described, the jaws or rods 195 will be closed to sense the pins left standing. Just as there described, also, the motor 250 will be started after the sensing operation to raise the racks. Where there has been a pin P left standing after the rolling of the first ball of a frame, however, as the racks 187 and 200 ascend the standing pin or pins P will be lifted off the alley since it or they will be gripped by the jaws or rods 195. As with a "strike" ball, when a pin or pins have been left standing after the first ball of a frame has been rolled, the racks 187 and 200 will be stopped after picking up the pin or pins when they reach their up positions, and the sweep motor 41 will be actuated to drive the sweep to sweep the fallen pins off the alley.

Where a pin P has been left standing, the switch 245 (FIGS. 4, 5 and 18) corresponding to the pin will remain closed at the end of the sensing operation; and the selector relay 332 will remain energized. The circuit to this relay is from ground L₂ through line 333, the relay coil 332, line 331, the closed switch or switches 245, and line 330 to main line L₁. Therefore arms 334 and 335 of the relay will be shifted from the positions shown in FIG. 18. This will make a circuit to relay 430 when the switch 440 is closed as described above at the end of the sensing movement of the racks 187 and 200. This circuit will be from main line L₁ through line 441, arm 444 of switch 440, line 465, switch arm 335, line 500, relay 430, and lines 501 and 359 to ground L₂. Energizing of relay 430 will close arms 502, 503, 504, 505, 506 and 507 of this relay. This relay is held energized by a hold-in circuit extending from line L₂ through line 359, line 501, the relay 430, line 500, line 560, contact 502, line 561, contact 505, line 562, now-closed contact 343, and line 312 to line L₁. Then the latch 265 (FIG. 10) will be disengaged by energization of solenoid 269 through a circuit extending from line L₂ (FIG. 18) through line 302, solenoid coil 269, line 303, contact 304, lines 305 and 306, now-closed contact 504 of relay 430, line 366, now-closed contact 342, and lines 365 and 312 to main line L₁, to allow the racks to return the picked-up pin or pins to the alley floor or deck. In this case, however, solenoid 270 (FIG. 11) will be energized to move catch 266 into position to stop the descent of the racks at the sensing level. Then, as previously described, the motor 205 is actuated and the jaws or rods 195 are opened to release the pins previously picked up. Then, as before, motor 250 is rendered operative to lift the racks 187 and 200 back to their up positions. The machine is now ready for the rolling of the second ball of the frame.

Each time that the sweep member 56 (FIG. 3) trips limit switch 440 after a sweeping operation has been effected, a circuit is closed to a solenoid 510 (FIG. 18). This circuit is from main line L₁, through line 441, arm 444 of switch 440, line 465, line 511, switch arm 512, line 513, relay 510, and lines 514 and 359 to ground line L₂. This energized solenoid 510 causes a pawl 515, which is attached to the armature of the solenoid, to advance the ratchet wheel 516 one step. The ratchet wheel 516 is fastened to a shaft to which there is also secured the four-lobed cam 355. Advance of the ratchet wheel therefore causes a ninety degree advance of the cam 355. This causes the follower 518 to ride down into a low spot of the cam 355. This closes contacts 520 and 521 and opens contacts 353 and 512.

The opening of the contact 353 breaks the circuit to relay 350; but the closing of contact 520 makes a circuit, when the next ball is rolled and strikes the apron 70 (FIG. 3) and closes switch 73, from main line L₁ through switch 73, lines 352 and 525, now-closed contact 520, line 526, relay 530, and lines 527 and 359 to ground line L₂.

Energization of relay 530 closes contacts 531 and 532. Closing of contact 531 reestablishes the circuit to relay 380 from line L₂ through lines 359, 381, the coil of relay 380, lines 382 and 534, contact 531, and lines 535, 536 and 395 to main line L₁.

When the second ball of a frame is rolled, then, the sweep motor 41 itself is actuated as soon as switch 73 is closed by the ball striking the apron 70 (FIG. 3). This circuit is from ground line L₂ through line 392, motor 41, line 393, contact 390, and lines 394 and 395 to main line L₁. All of the pins are therefore swept off the alley before the racks 187 and 200 descend, regardless of whether some have been left standing or not.

When the sweeping operation has been effected, the detent 265 (FIG. 10) will be withdrawn and the rest of the operation will be the same as after a "strike" ball. The racks 187 and 200 will descend; as they descend a new set of pins will drop from baskets 131 of table 130

(FIG. 2) through the chutes 180 into cups 185 of the rack 187; then the motor 205 will be actuated to open jaws or rods 195 to release these pins and they will be set on the alley deck or floor. Then, as before, the rack will be raised. The alley will now be set up ready for the next frame of the game.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Apparatus for setting pins upon a bowling alley comprising an upper rack and a lower rack, which are movable toward and from one another, a plurality of open-bottomed cups mounted on said upper rack and arranged in a relationship to one another corresponding to the positions which the pins are to occupy when they are set up on the alley, means for delivering pins into said cups, a plurality of pairs of rods mounted on said lower rack to extend across the alley, the two rods of each pair being movable toward and away from one another to grip and release, respectively, any pins between said rods, said rods, when in proximate position, preventing said pins from dropping out of said cups, means carried by said upper rack and operatively connected to said rods to move the two rods of each pair away from one another on movement of said upper rack toward said lower rack and to move the two rods of each pair toward one another on movement of said upper rack away from said lower rack and means for lowering said racks together a predetermined distance and for thereafter moving the upper rack toward the lower rack to set a full set of pins on the alley.

2. Apparatus for setting bowling pins on a bowling alley comprising an upper rack, a parallel lower rack, said racks being movable jointly with and independently of one another toward and away from the alley, a plurality of pairs of rods mounted on the lower rack for movement toward and away from one another, each of said rods extending across the alley, means for lowering and raising the racks together, means carried by said upper rack and operatively connected to said rods to move the two rods of each pair away from one another on movement of said upper rack toward said lower rack and to move the two rods of each pair toward one another on movement of said upper rack away from said lower rack, means for stopping the racks after they have been lowered to a predetermined position, means for moving the upper rack away from said lower rack to move the two rods of each pair toward one another at said predetermined position to grip between them any pins left standing on the alley after the rolling of the first ball of a frame, means for sweeping off the alley all fallen pins, a plurality of open-bottomed cups mounted on said upper rack and adapted to receive pins that are to be placed on the alley, said cups being arranged relative to one another in a relationship corresponding to the positions which the pins are to occupy on the alley, said rods being disposed so that when the two rods of each pair are in proximate positions they prevent the pins from dropping out of said cups, and being so disposed that when the two rods of each pair are in their distal positions pins may drop from the cups between the rods onto the alley, means for sensing whether any pins are left standing on the alley when said racks are in said predetermined position, and control means operative to effect in sequence raising of said racks, operation of said sweeping means, relowering of said racks to said predetermined position, and movement apart of said rods to reset the lifted pins, if any pins have been left standing on the alley, and to effect raising of said racks, operation of said sweeping means, supplying of pins to said cups, relowering of the racks below said predetermined position, and movement apart of said rods to permit the pins in said cups to be set on said alley, if no pins have been left standing on the alley after rolling of the first ball of said frame.

3. Apparatus for setting pins upon a bowling alley, comprising an upper rack, a lower rack disposed beneath the upper rack in parallel relation thereto, a plurality of pairs of parallel pin-gripping rods mounted on said lower rack in horizontal slots for movement rectilinearly toward and away from one another of the two rods of each pair, each of said rods extending across the alley, a cam plate for each pair of rods secured to and depending from said upper rack, each cam plate having two slots therein in which the two rods of the associated pair are slidable, the two slots of each cam plate converging toward one another downwardly, whereby when said upper rack is moved toward said lower rack, the two rods of each pair are moved apart and vice versa, means for lowering both racks, means for stopping the lowering movement of the lower rack selectively at one of two predetermined positions one below the other, and means for selectively moving said racks toward and away from one another in the upper of said two predetermined positions and for moving said racks toward one another in the lower of said two predetermined positions.

4. Apparatus for setting pins upon a bowling alley, comprising an upper rack, a lower rack disposed beneath the upper rack in parallel relation thereto, a plurality of pairs of parallel rods mounted on said lower rack in horizontal slots therein for movement rectilinearly toward and away from one another of the two rods of each pair, each of said rods extending across the alley, a cam plate for each pair of rods secured to and depending from said upper rack, each cam plate having two slots therein in which the two rods of the associated pair are slidably mounted, the two slots of each cam plate converging toward one another downwardly, whereby when said upper rack is moved toward said lower rack, the two rods of each pair will be moved apart and vice versa, means for lowering both racks, means for stopping the lowering movement of the lower rack at a predetermined position, and means operative at said position to move said upper rack away from said lower rack to cause the several pairs of rods to clamp between the two rods of the pairs any pins left standing between them, means for thereafter raising the racks, for sweeping fallen pins off the alley, for relowering the racks again, and for moving said upper rack toward said lower rack when the racks have been relowered to move the two rods of each pair of rods apart.

5. Apparatus for setting pins upon a bowling alley, comprising an upper rack, a lower rack disposed beneath said upper rack in parallel relation thereto, a plurality of open-bottom, pin-holding cups mounted in said upper rack in generally triangular relation with one cup in the first row and two, three, and four cups in succeeding rows, means for supplying pins to said cups, four pairs of parallel rods mounted on said lower rack in horizontal slots therein for movement toward and away from one another of the two rods of each pair, each of said rods extending across the alley and said rods being so disposed with relation to said cups that when the two rods of the several pairs are in proximate positions they will prevent pins from dropping out of said cups, a cam plate for each pair of rods secured to and depending from said upper rack, each cam plate having two slots therein in which the two rods of a pair are slidably mounted, the two slots of each cam plate converging toward one another downwardly, whereby when said upper rack is moved toward said lower rack, the two rods of each pair will be moved apart and vice versa, means for lowering both racks after rolling of the first ball of a frame, means for stopping the lowering movement of the lower rack at a predetermined position, means operative at said position to urge said upper rack away from said lower rack to cause the several pairs of rods to clamp between the two rods of the pairs any pins left standing between them, means connected with each pair of rods for sensing whether any pins have been left standing between the pair, means for thereafter raising said rack, for sweeping fallen pins off the alley, for releasing the racks again, and, if the sensing means has detected standing pins, for stopping said lower rack at said predetermined position, and moving said upper rack away from said lower rack to release and reset the pins picked up, and, if said sensing means has detected no standing pins for retracting said stop means to allow said racks to descend below said predetermined position, and for moving said upper rack toward said lower rack in the lower position to move the two rods of each pair apart to release the pins from said cups and set them on the alley.

6. Apparatus for setting bowling pins on a bowling alley, comprising an upper rack, a parallel lower rack, said racks being mounted for movement jointly with and independently of one another toward and away from the alley, a plurality of pairs of parallel gripping rods mounted on the lower rack to extend across the alley, the two rods of each pair being movable toward and away from one another to grip and release, respectively, any pins disposed between said pair of rods, means carried by said upper rack and operatively connected to said rods to move the two rods of each pair away from one another on movement of said upper rack toward said lower rack and to move the two rods of each pair toward one another on movement of said upper rack away from said lower rack, means for lowering and raising the two racks together, means operative in sequence after the rolling of the first ball of a frame to stop downward movement of said lower rack when said lower rack reaches a predetermined position, then to move said upper rack away from said lower rack to cause the several pairs of rods to grip any pins left standing between them, then to raise the two racks together to lift any standing pins, then to lower said racks together a second time to reset those pins on the alley, and then to move said upper rack toward said lower rack to release said pins, means carried by one rod of each pair to sense whether any pin is between a pair of rods when the pair of rods are moved together, and means operated thereby to render said stop means inoperative, and for moving the two rods of each apart and supplying a whole new set of pins to the alley when said racks are lowered the second time, if said sensing means have detected no pins between any of the pairs of rods when said rods were moved together the previous time the racks were at said predetermined position.

References Cited in the file of this patent
UNITED STATES PATENTS

| | | |
|---|---|---|
| 1,203,216 | McFarland | Oct. 31, 1916 |
| 1,524,241 | Hedenskoog | Jan. 27, 1925 |
| 1,584,030 | Gray | May 11, 1926 |
| 2,231,842 | Rundell | Feb. 11, 1941 |
| 2,620,187 | Wipple et al. | Dec. 2, 1942 |
| 2,625,397 | Frye | Jan. 13, 1953 |
| 2,672,341 | Flint | Mar. 16, 1954 |
| 2,692,139 | Dumas | Oct. 19, 1954 |
| 2,736,554 | Fluke et al. | Feb. 28, 1956 |
| 2,911,218 | Scherzinger | Nov. 3, 1959 |